(12) United States Patent
Kalyanasundharam et al.

(10) Patent No.: US 10,248,564 B2
(45) Date of Patent: Apr. 2, 2019

(54) CONTENDED LOCK REQUEST ELISION SCHEME

(71) Applicant: Advanced Micro Devices, Inc., Sunnyvale, CA (US)

(72) Inventors: Vydhyanathan Kalyanasundharam, San Jose, CA (US); Eric Christopher Morton, Austin, TX (US); Amit P. Apte, Austin, TX (US); Elizabeth M. Cooper, Los Gatos, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 202 days.

(21) Appl. No.: 15/192,734

(22) Filed: Jun. 24, 2016

(65) Prior Publication Data
US 2017/0371787 A1    Dec. 28, 2017

(51) Int. Cl.
*G06F 12/0815*   (2016.01)
*G06F 12/0813*   (2016.01)
*G06F 9/52*   (2006.01)
*G06F 12/0842*   (2016.01)
*G06F 12/0817*   (2016.01)

(52) U.S. Cl.
CPC .......... *G06F 12/0815* (2013.01); *G06F 9/526* (2013.01); *G06F 12/0813* (2013.01); *G06F 12/0828* (2013.01); *G06F 12/0842* (2013.01); *G06F 2209/522* (2013.01); *G06F 2209/523* (2013.01); *G06F 2212/1024* (2013.01); *G06F 2212/1041* (2013.01); *G06F 2212/154* (2013.01); *G06F 2212/284* (2013.01); *G06F 2212/608* (2013.01); *G06F 2212/62* (2013.01)

(58) Field of Classification Search
None
See application file for complete search history.

(56) References Cited

U.S. PATENT DOCUMENTS

| 7,373,466 | B1 | 5/2008 | Conway |
| 7,480,784 | B2 | 1/2009 | Hummel et al. |
| 7,640,315 | B1 | 12/2009 | Meyer et al. |
| 2010/0023706 | A1 | 1/2010 | Christie et al. |

OTHER PUBLICATIONS

Veldema et al., Runtime Optimizations for a Java DSM Implementation, 2001, ACM, pp. 153-162 (Year: 2001).*

* cited by examiner

*Primary Examiner* — Gary W. Cygiel
(74) *Attorney, Agent, or Firm* — Meyertons Hood Kivlin Kowert and Goetzel PC; Rory D. Rankin

(57) ABSTRACT

A system and method for network traffic management between multiple nodes are described. A computing system includes multiple nodes connected to one another. When a home node determines a number of nodes requesting read access for a given data block assigned to the home node exceeds a threshold and a copy of the given data block is already stored at a first node of the multiple nodes in the system, the home node sends a command to the first node. The command directs the first node to forward a copy of the given data block to the home node. The home node then maintains a copy of the given data block and forwards copies of the given data block to other requesting nodes until the home node detects a write request or a lock release request for the given data block.

20 Claims, 10 Drawing Sheets

US 10,248,564 B2

CONTENDED LOCK REQUEST ELISION SCHEME

BACKGROUND

Technical Field

This invention relates to computing network systems, and more particularly, to managing communications between multiple nodes.

Description of the Relevant Art

In modern microprocessors, one or more processors and/or processor cores are included in the microprocessor, where each processor is capable of executing instructions in a superscalar pipeline. The microprocessor includes, or is coupled to, one or more levels of a cache hierarchy in order to reduce the latency of the microprocessor's requests for data. Additionally, in order to increase computing performance, computing systems often include multiple nodes with each node having one or more microprocessors. In some cases, a given block of data is stored in multiple caches of multiple nodes. Since one of the cached copies may be modified in one node with respect to cached copies in other nodes, the computing system is configured to maintain cache coherency according to a given cache coherency protocol. Various specific coherency protocols are well known.

Many such coherency protocols include the use of messages, commands, and/or probes, which are passed between nodes in the system. In some cases, messages are coordinated by a given coherency point, such as a memory controller. In addition, probes are used for synchronizing accesses to given blocks. Software typically uses a locking mechanism for synchronizing accesses to data. In various systems, many threads attempt to acquire a lock on a given block of data. In such cases, a particular node (e.g., a home node) for the given block receives a number of lock acquisition requests for the given block. In response to such requests, the home node will generally process the lock acquisition requests serially. For example, in such a case a first thread successfully acquires a lock for the given block. Once the first thread completes processing of the given block, the first thread conveys a message to the node to release the lock. However, due to earlier received lock acquisition requests being processed in a serialized manner, the lock release request from the first thread cannot be processed until the prior requests have been processed. Consequently, a delay occurs before the lock is released.

In view of the above, efficient methods and systems for managing communications in a multi-node processing system are desired.

SUMMARY OF EMBODIMENTS

Systems and methods for managing communications between multiple nodes are contemplated. In various embodiments, a computing system includes multiple processing nodes connected to one another. Each processing node contains one or more processing cores and one or more corresponding cache memory subsystems. Multiple nodes are configured to generate read access requests for data blocks assigned to a home node. For a given data block that is assigned to the home node, a node other than the home node currently stores a copy of the given data block. Other nodes send read access requests to the home node for the given data block while the other node has the copy of the given data block.

When the home node determines that a number of nodes requesting read access for the given data block has exceeded a threshold, and a copy of the given data block is stored at another node, the home node sends a command to the first node. The command sent to the first node directs the first node to forward a copy of the given data block to the home node. In addition, the first node is directed to change a cache coherency state for the copy of the given data block to an owned coherency state.

Responsive to the receiving the copy, the home node forwards a copy of the given data block to a requesting node, such as a second node of the multiple nodes. Additionally, the second node is directed to change a cache coherency state for the copy of the given data block to a shared state. The home node continues forwarding a copy of the given data block to other requesting nodes until the home node detects a write request or a read request with intent to modify for the given data block.

These and other embodiments will be further appreciated upon reference to the following description and drawings.

Figure 1:
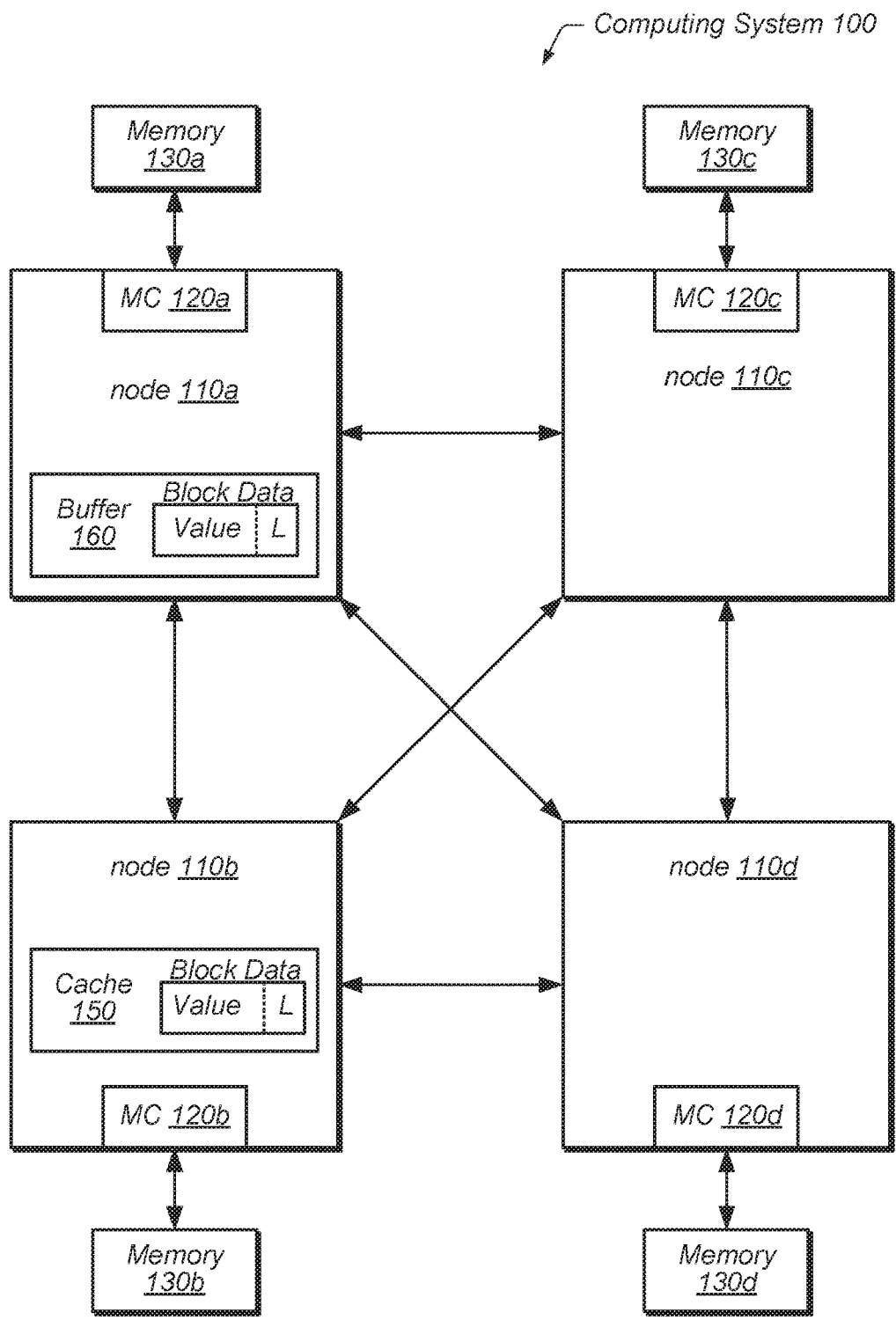
FIG. 1 is a generalized diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Referring to FIG. 1, one embodiment of a computing system 100 is shown. Computing system 100 includes multiple processing nodes 110a-110d. The processing nodes 110a-110d may also be referred to as nodes 110a-110d. Although four nodes are shown in FIG. 1, other embodiments include a different number of nodes, each including one or more processor cores and one or more corresponding cache memory subsystems.

Each one of the nodes 110a-110d is connected to a respective one of the memories 130a-130d. A respective one of the memory controllers 120a-120d within a processing node is used to connect the processing node to a respective one of the memories 130a-130d. The memory controllers 120a-120d include control circuitry for interfacing to the memories 130a-130d. Additionally, the memory controllers 120a-120d include request queues for queuing memory requests. Memories 130a-130d include any suitable memory devices. For example, in various embodiments, each one of the memories 130a-130d includes one or more dynamic random access memories (DRAMs), synchronous DRAMs (SDRAMs), static RAM, dual in-line memory modules (DIMMs), a hard disk, a solid-state drive, or otherwise.

The address space of computing system 100 is divided among the memories 130a-130d. Each one of the processing nodes 110a-110d includes a memory map used to determine which addresses are mapped to which one of the memories 130a-130d, and hence to which one of the processing nodes 110a-110d a memory request for a particular address should be routed. In various embodiments, the coherency point for an address within computing system 100 is one of the memory controllers 120a-120d within one of the nodes 110a-110d connected to the one of the memories 130a-130d storing bytes corresponding to the address. However, in other embodiments a different component is configured to act as a coherency point.

Each one of the processing nodes 110a-110d includes interface logic to communicate with other nodes of the processing nodes 110a-110d. Additionally, each one of the processing nodes 110a-110d is connected to one or more input/output (I/O) devices and/or I/O buses, which are not shown for ease of illustration. In various embodiments, computing system 100 implements packet-based links for inter-node communication. In the depicted embodiment, the links are shown as bidirectional lines between the nodes 110a-110d. In other embodiments, one or more of the nodes 110a-110d is connected to others of the nodes 110a-110d through a network, such as a LAN, a WAN, a WiFi connection, Ethernet, Fibre Channel, Internet, or otherwise.

The packets transmitted across the links includes messages, commands, requests and probes. The links between the nodes 110a-110d are operated in a cache coherent fashion. It is noted that although each one of the nodes 110a-110d is shown directly connected all other nodes of the other nodes 110a-110d, in other embodiments there is not a direct connection to all other nodes. In such embodiments, a packet being transmitted from one processing node to another passes through one or more intermediate nodes. Computing system 100 employs any suitable flow control mechanism and algorithm for transmitting packets.

In various embodiments, the one or more processors within each of the nodes 110a-110d is connected to one or more levels of a cache hierarchy in order to reduce the latency of a processor's request for data. Generally speaking, a cache stores one or more blocks of data, each of which corresponds to data stored at a corresponding address in the system memory. As used herein, a "block" is a set of bytes stored in contiguous memory locations, which are treated as a unit for coherency purposes. In some embodiments, a block is the unit of allocation and deallocation in a cache. The number of bytes in a block varies according to design choice. As an example, 32 byte and 64 byte blocks are often used. As used herein, the terms data block, cache line and cache block are used interchangeably in the below descriptions of the various embodiments.

As the address space of the computing system 100 is divided among the memories 130a-130d, the address of a given data block is mapped to a particular one of the nodes 110a-110d. This particular node is considered a "home" node for the given data block. When a valid copy of a given data block is stored with a modified (M), exclusive (E), or owned (O) coherency state in another node of the nodes 110a-110d, this other node is referred to as an "owner" node. For example, the address of a given block is mapped to node 110a, which makes node 110a the home node for the given block. However, if node 110b requests an exclusive copy of the given block, receives the requested copy, and stores the copy of the given block in memory 130b, node 110b is the owner node for the given block.

In various embodiments, work to be performed by the processors in the nodes 110a-110d corresponds to one or more processes, each consisting of one or more threads. In various embodiments, packets sent across the links in computing system 100 is used for synchronizing accesses to blocks of data.

In various embodiments, an indication of a lock (e.g., an indication that a block of data is currently locked or unlocked) is stored within the data of the data block. In some embodiments, the indication of the lock is a single bit within the data of the data block. In other embodiments, the indication of the lock is a byte within the data of the data block. For example, in one embodiment a byte is used with a test-and-set instruction type. Other data sizes for the indication of the lock within the data of the data block are possible and are contemplated. In some embodiments, an indication of the owner of the lock is also stored within the data of the data block. In other embodiments, a software mechanism determines the owner of the lock externally from the data within the given block. For example, a software mechanism uses a thread identifier (ID) stored elsewhere to determine the owner of the lock.

As noted above, the given block is originally assigned to a home node. In one example, the node 110a is a home node for a given block in computing system 100. At a later time, the node 110b requests the given block from the node 110a. In some embodiments, the request from the node 110b includes an indication of a requested cache coherency state for the given block according to a cache coherency protocol.

In various embodiments, the MOESI cache coherency protocol is used in the computing system 100. In such an embodiment, each cache line in the computing system 100 is in one of five cache coherency states. The five states include the modified (M) state, which indicates the cache storing a copy of the cache line has the only valid copy of the cache line and changes have been made to the copy. The owned (O) state indicates the cache storing a copy of the cache line is one of multiple caches with a valid copy of the cache line, but the cache has the exclusive right to make changes to its copy of the cache line. The exclusive (E) state indicates the cache storing a copy of the cache line has the only valid copy of the cache line, and no changes have been made to the copy. The shared (S) state indicates the cache storing a copy of the cache line is one of multiple caches with a valid copy of the cache line, but the cache does not have permission to modify the copy. The invalid (I) state indicates the cache does not store a valid copy of the cache line.

In other embodiments, other cache coherency protocols are used in the computing system 100. For example, the MSI, MESI, MESIF and MOESIF cache coherency protocols are used in the computing system 100. The MESIF and MOESIF protocols use the Forward (F) state to indicate that a cache storing a copy of the cache line acts as a designated responder for any requests for the given line. The protocol ensures that, if any cache holds a cache line in the Shared (S) state, at most one other cache holds the cache line in the Forward (F) state. In embodiments that do not use the Owned (O) state in the cache coherency protocol, the Shared (S) state is used for the given block. Generally speaking, the methods and mechanisms described herein are not limited to any particular cache coherency protocol.

As shown in FIG. 1, the data within the given block includes an indication ("L") of a lock. As used herein, setting the lock within the data of the given block refers to asserting a lock bit within the data of the given block, modifying a byte used to indicate the lock within the data of the given block to a value indicating a set lock or a locked state, and so forth. Similarly, resetting the lock within the data of the given block refers to de-asserting a lock bit within the data of the given block, modifying a byte used to indicate the lock within the data of the given block to a value indicating a reset lock or an unlocked state, and so forth.

As the indication of the lock is within the data of the given block itself, a read of the data also includes an indication as to whether or not the data is locked. As such, the data of the given block is read in order to read the indication of the lock. In other words, a read of the data of the given block is performed to inspect, check or read the indication of the lock within the data of the given block. It is noted that when a processor within a node is setting or resetting a lock within the data of the given block, the modifying operation is guaranteed to complete before the node processes an external probe or other read request from another node. Enforcing the ordering between the internal modification of the data within the given block and the external probe request avoids live-lock situations.

In various embodiments, special instructions may not be included for the purpose of setting or resetting a lock. Rather, setting or resetting the lock is done responsive to using requests to modify (or gain permission to modify) data within a given block. Such requests include a write request, a read with intent to modify request, and so forth. Consequently, in such an embodiment, a write request or read with intent to modify request is considered a "lock request." In other embodiments, special instructions could be included for the purpose of setting or resetting a lock. Either and/or both are possible in a given embodiment.

For the request for the given block from the node 110b, in some embodiments, the request indicates (either explicitly or implicitly) a request to receive a copy of the given block in the modified (M) state of a coherency protocol. As shown, the given block of data is stored in a local cache 150 of the owner node (node 110b). As shown, the block of data includes a data value, indicated by "Value", and a lock indication "L". In this embodiment, the indication of the lock is within the data of the given block. In one scenario, the owner node (node 110b) is ready to reset (release) the lock, which is why it requested exclusive access for the given block. As described earlier, resetting a lock includes de-asserting a lock bit within the data of the given block, modifying a byte used to indicate the lock within the data of the given block to a value indicating a reset lock or an unlocked state, or otherwise.

In a given scenario, the home node (node 110a) for the given block receives one or more requests for access to the given block at a time when it is owned by another node. In various embodiments, a request for access is either explicitly or implicitly a lock acquisition request. Responsive to a received lock acquisition request, the home node (node 110a) is configured to request that the owner node (node 110b) return a copy of the given block to the home node. The home node (node 110a) allocates an entry in a forwarding buffer 160 to store the returned copy of the given block. As shown, the forwarding buffer 160 includes a copy of the data, which includes a copy of the data value, "Value," and a copy of the indication of the lock, "L." The home node (node 110a) forwards the copy of the data in the forwarding buffer 160 to each of the nodes requesting access to the given block.

Figure 2:
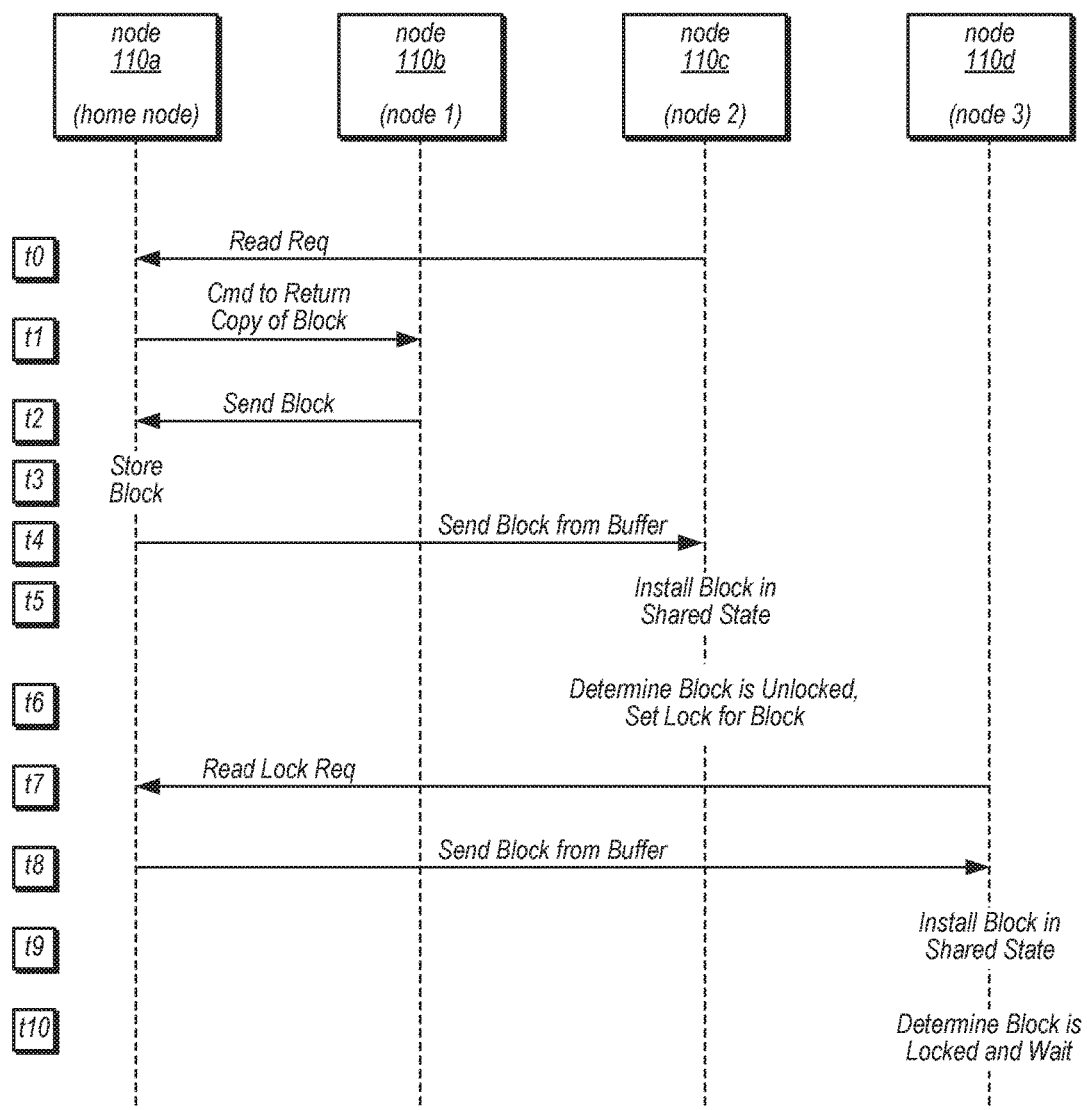
FIG. 2 is a generalized diagram of one embodiment of a sequence diagram used for handling read and write requests in a multi-node computing system.

Turning now to FIG. 2, one embodiment of a generalized sequence diagram is shown that illustrates a home node (110a) receiving a read request for a given data block from a node when the given data block is currently owned by another node (node 1-110b). In the example shown, circuitry and logic described earlier are numbered identically. For example, the nodes 110a-110d are shown again. Similarly, the node 110c is shown as node 2 and the node 110d is shown as node 3. The node 110a is referred to as the home node. It is noted that the sequence diagrams provided herein are provided for ease of discussion and are not intended to indicate a strict ordering of events. Rather, some of the events may occur concurrently and may occur in a different order.

At time t0 the home node receives a read request from node 2 (110c), which is treated as a lock request. The read request indicates an address corresponding to a given data block. The home node receives the read request at time t0 when node 110b is currently the owner of the requested data block. For example, the owner node (node 1) has a copy of the given data block stored in its local cache and also has a stored indication of a cache coherency state for the block.

Responsive to receiving the request at time t0, the home node searches a directory type data structure to determine that node 1 is currently the owner node for the requested block. In addition, the home node maintains a count of received read requests for the given data block and increment the count in response to the request. In various embodiments, when a read request for a given data block hits on a prior pending read request for the given data block, the home node increments a count of read requests for the given data block. If a read request is received and the count has not reached a given threshold, the home node processes the received request by determining which node is the current owner and send a command to the owner node. The command directs the owner node to send a copy of the given data block to the requesting node 2. In contrast, if a read request is received and the count reaches (or has reached) the threshold, the home node processes requests for the given data block in a different manner. For example, the home node may itself send a copy of the given data block from a local forwarding buffer to the requesting node 2, rather than request that the owner node forward a copy of the given data block to the requesting node 2.

As will be discussed in greater detail below, in order for the home node to store a copy of the given data block in its local forwarding buffer, the home node first requests a copy of the given data block from the owner node. In some embodiments, when the count maintained by the home node reaches the given threshold, the home node stores an indication indicating the given threshold is reached. For example, the stored indication is a flag (e.g., a mode indicator) that indicating a different mode is to be used for processing received read requests for the given data block. In other embodiments, the home node simply checks the count each time a request is received to determine whether the given threshold has been reached. In such an embodiment, a comparison of the count itself to the threshold is used to determine the mode. In some embodiments, the home node resets the count when a write request or a lock release request for the given data block is received. In the example shown in FIG. 2, the count for the given data block has reached the given threshold upon receiving the read block request at time t0. The home node is also configured to search its forwarding buffer, such as the earlier forwarding buffer 160, to determine whether it has a copy of the requested data block. In some embodiments, the home node first searches the forwarding buffer before searching the directory.

At time t1, the home node sends a command to the owner node that directs the owner node to send a copy of the given data block to the home node. In addition, the command sent from the home node directs the owner node to store a cache coherency state of "owned" for its copy of the data block.

At time t2, the owner node sends a copy of the given data block to the home node. In this case the owner node does not send a copy of the data block to the requesting node, node 2. At time t3, the home node receives the copy of the given data block and stores it in a forwarding buffer (e.g., the earlier discussed forwarding buffer 160). It is noted that the forwarding buffer may be any of a variety of storage locations. For example, in one embodiment the forwarding buffer is a portion of a cache assigned to store values for forwarding purposes. Alternatively, in another embodiment, the forwarding buffer is a set of registers assigned to store values for forwarding purposes. Further, the forwarding buffer may be implemented as a random access memory (RAM) data structure, a content addressable memory (CAM) data structure, and so forth. In some embodiments, the given data block is not yet written back to the system memory, such as the earlier memory 130*a*. In other embodiments, the given data block is written back to the system memory while a copy remains in the forwarding buffer.

At time t4, the home node sends a copy of the received data block to node 2. At time t5, node 2 stores the copy of the given data block (e.g., in one of its local caches) with a shared (S) coherency state of the cache coherency protocol (e.g., MOESI). At time t6, node 2 inspects the data of the given data block and discovers the lock bit is reset (i.e., the data is not locked). Therefore, the given data block is available for being locked. node 2 modifies the data of the given data block to set the lock. As described earlier, in some embodiments, setting the lock includes asserting a lock bit within the data of the given block. Alternatively, in other embodiments, setting the lock includes modifying a lock byte within the data of the given block to indicate a set lock. The given data block is now considered locked.

At time t7, node 3 sends a read request for the data block to the home node. Again, the home node receives the request and determines the home node does not currently own the given data block, but rather the owner node currently owns the given data block. At time t8, the home node sends a copy of the given data block from its forwarding buffer to node 3, which requested the given data block. At time t9, node 3 stores the copy of the given data block in one of its local caches with the shared (S) coherency state. At time t10, node 3 inspects the data of the given data block and discovers the lock bit is set. node 3 is unable to use the given data block while it is locked. Therefore, node 3 waits and recheck the data of the given data block periodically while waiting to use it. It is noted that in various embodiments a node inspects the lock bit of data before the data block is stored in a local cache.

Should one or more additional nodes send a request (lock read request or a simply a read request) to the home node for the given data block, the home node conveys a copy of the block from its forwarding buffer to each requestor. As such, the home node does not communicate with the owner node regarding the received request. At a later time, the owner node writes back the given data block to the home node and invalidate the copy stored at the owner node.

As noted above, a count of access requests is maintained by the home node. In various embodiments, a count of read requests for the given data block is reset when a write request or a lock release request corresponding to the given data block is received at the home node. In addition, the owner node is directed to return the given data block to the home node if such an operation has not yet occurred so that the home node performs any requested modifications and store a copy of the updated given data block in its system memory, such as the earlier memory 130*a* in computing system 100.

Figure 3:
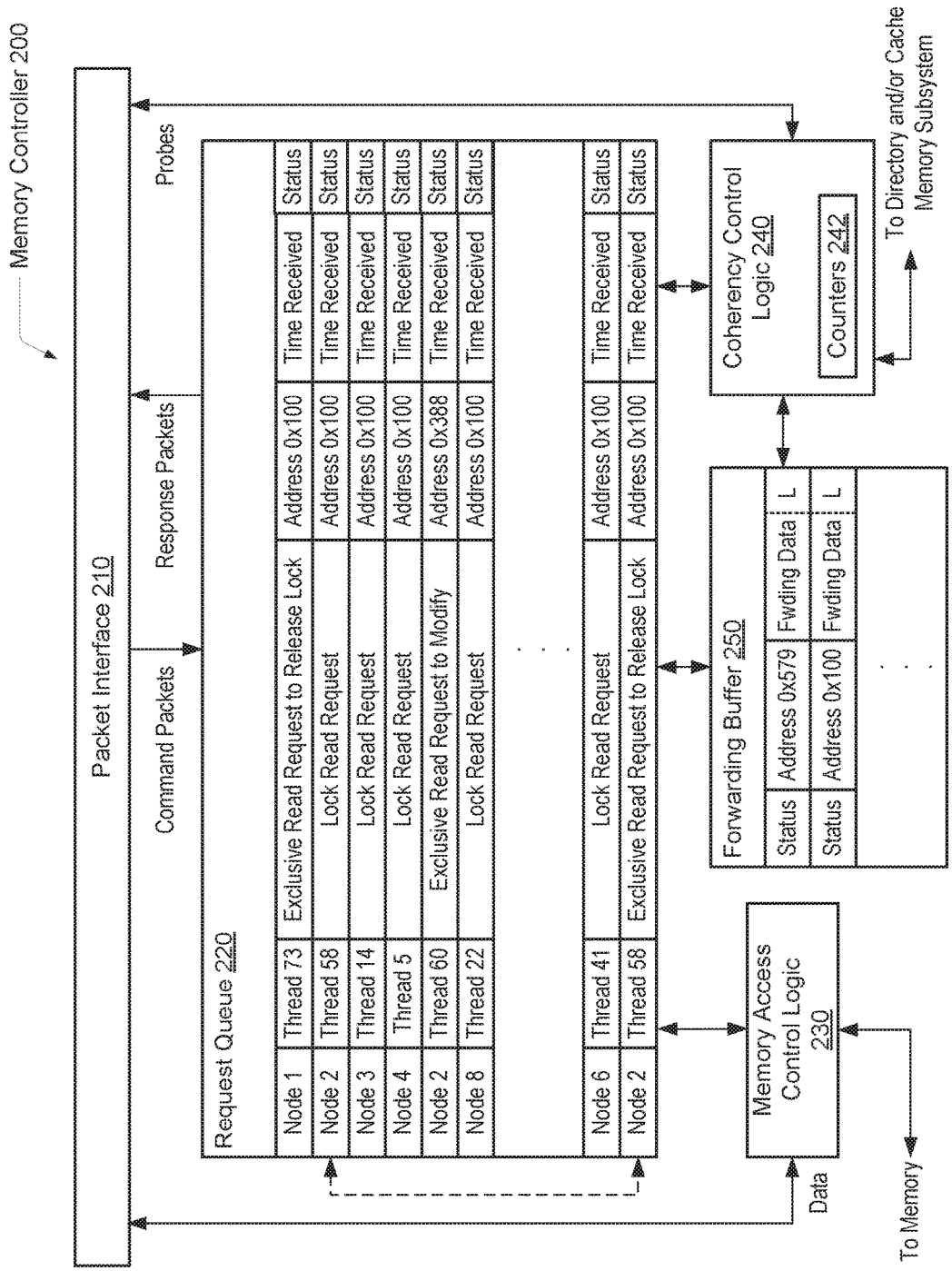
FIG. 3 is a generalized diagram of one embodiment of a memory controller.

Turning next to FIG. 3, one embodiment of a memory controller 200 is shown. The memory controller 200 is used to implement the above-described sequence steps for handling a series of read requests for a same given address from multiple sources, such as from multiple threads from nodes other than the home node. For example, the memory controller 200 is used to store a given block in a forwarding buffer when particular conditions are satisfied. In addition, the memory controller 200 sends the given block from the forwarding buffer directly to a requesting node, rather than direct an owner node to forward its copy to the requesting node. The direct forwarding from the home node reduces the number of hops or intermediate nodes used to send a copy of the given block to the requesting node.

In the embodiment of FIG. 3, the memory controller 200 includes a packet interface 210, a request queue 220, memory access control logic 230, coherency control logic 240, counters 242, and forwarding buffer 250. The packet interface 210 receives command packets from other nodes through a network or other interface. In some embodiments, the packet interface 210 is included within a network interface or other interface used for communicating with other nodes.

The packet interface 210 is coupled to send received command packets to the request queue 220. Command packets is routed to the memory controller 200 if the address indicated by the command packet corresponds to a memory location in the memory associated with the memory controller 200. In other words, if the address of the command packet addresses a block stored in the memory connected to the memory controller 200, the command packet is routed to the memory controller 200. Response packets is prepared once a respective packet stored in the request queue 220 is processed. In such a case, the packet interface 210 also sends the response packets to other nodes.

When received, the memory controller 200 queues the command packet information in the request queue 220, and subsequently processes the command. Responsive to receiving a packet, an available entry in the request queue 220 is allocated for the received packet. As shown, each entry stores one or more of a node identifier (ID), a thread ID, an indication of a command, an address corresponding to the command, an indication of age (e.g., time received), and status information.

The status information in the request queue 220 includes one or more of a data size, an indication of a valid entry, a priority level for the command, a field for storing result data for the corresponding command, a pointer identifying a location in another queue which stores result data, an indication of whether the command is successfully processed, and so forth. Although the fields in the entries of the request queue 220 are shown as stored in a particular order and in a contiguous manner, other combinations of storage arrangements are possible and are contemplated.

In some embodiments, all command packets are processed in the order they are received. In other embodiments, in order processing of packets is required for command packets directed to a same address. In such a case, packets directed to a different address may be processed out of order with respect to those packets. In yet other embodiments, command packets are processed in an order determined by one or more of a priority level, a command type, an indication of age such as a timestamp or position within a queue, the address, a data size, a thread ID, a node ID, and so forth.

The memory access control logic 230 includes logic and storage registers that interface with each of the request queue 220 and the memory connected to the memory controller. For example, if the memory controller 200 is the memory controller 120a for the node 110a described earlier, then the memory is memory 130a. The memory access control logic 230 performs commands after associated coherency operations have been transmitted and any responses are received from other nodes. If the command is a read operation, data is returned from the memory to be stored in a response packet in one of the packet interface 210, the request queue 220, the forwarding buffer 250 when particular conditions are satisfied, or another queue (not shown) designated for storing result data. It is noted that logic within the memory access control logic 230 is implemented in hardware, in software such as firmware, or a combination.

The coherency control logic 240 includes logic and storage registers that interface with each of the request queue 220, any directory type structure used for directing probes to other nodes, the cache memory subsystem for the associated node, and the forwarding buffer 250. Similar to the memory access control logic 230, any logic within the coherency control logic 240 is implemented in hardware, in software such as firmware, or a combination.

The coherency control logic 240 is configured to ensure that the command packets stored in the request queue 220 are processed in a coherent manner according to a cache coherency protocol. If probes are required for a given command, the coherency control logic 240 transmits a corresponding indication to the packet interface 210. For example, the indication includes the source node of the corresponding command, the address, the type of command, and other information. The packet interface 210 transmits probe commands in response to receiving the indication of the probe from the coherency control logic 240. The coherency control logic 240 further receives packets that indicate a corresponding transaction has completed from the packet interface 210, and receives probe responses for write commands.

As previously discussed, in various embodiments a node includes a directory used to determine which addresses are mapped to which system memory, and hence to which of the nodes in a computing system that a memory request for a particular address should be routed. The directory includes multiple entries, includes a memory map, or is used in combination with a memory map. An allocated entry in the directory for a given block indicates the given block in memory has a copy stored in a cache. The cache us within the same node or in another node. The allocated entry in the directory indicates the cache coherency state of the given block, such as the owner of the given block, whether the block is modified in a given mode, and/or nodes that have shared copies of the given block.

In various embodiments, a read operation corresponding to a given block with an allocated entry in the directory and a shared (S) coherency state does not require probe commands to invalidate other copies of the given block. However, a write operation of the given block with the S coherency state would require probe commands to cause invalidation of the other copies in other processing nodes. Therefore, the directory and the coherency control logic 240 are configured to detect this scenario and generate the appropriate probe(s) to send via the packet interface 210. Other scenarios of read and write operations with coherency states of given blocks with allocated entries in the directory are possible and are contemplated. In some embodiments, the absence of an allocated entry in the directory implies that the given block is not stored in a cache within the same node as the directory.

As shown, the coherency control logic 240 includes one or more counters 242. In various embodiments, the counters 242 is reset to zero and assigned to a given address corresponding to a received read request stored in the request queue 220. The assigned counter of the counters 242 is incremented for each subsequent read request for the given address. For example, the second entry shown in the request queue 220 stores a lock read request for the address 0x100. The "0x" in the address indicates a hexadecimal value. As shown, the lock read request is from thread 58 being processed on node 2. The third entry in the request queue 220 also stores a lock read request for the address 0x100. This subsequent read request is from thread 14 being processed on node 3.

In some embodiments, a given counter of the counters 242 assigned to the address 0x100 is incremented when the second read request, which is from node 2, is received. The counter is incremented for each subsequent read request for the address 0x100. The counter is reset and/or invalidated for the address 0x100 when a write request or a lock release request for the address 0x100 is received. For example, the first read request in the first entry of the request queue 220 is an exclusive read request to release a lock. The counter for the address 0x100 is reset in response to detecting this read request. When the second read request in the second entry of the request queue 220 is detected for the address 0x100, a counter is assigned to the address 0x100 and either set at 0 or incremented to 1.

When the third request in the third entry of the request queue 220 is detected for the address 0x100, the assigned counter of the counters 242 is incremented. Each subsequent read request or lock read request for the address 0x100 causes the assigned counter to be incremented. In some embodiments, the counter is a non-overlapping counter.

The read request in the last entry shown of the request queue 220 is another exclusive read request to release a lock. The counter for the address 0x100 is reset in response to detecting this read request. Before this particular read request is reached, the assigned counter of the counters 242 has reached a relatively high number. For example, as many as 64 threads may have sent a read request or a lock read request to the memory controller 200 corresponding to the address 0x100. When the given counter exceeds a threshold, the memory controller 200 changes the handling of the read requests corresponding to the assigned address, such as address 0x100 in the above example. In various embodiments, the threshold is a programmable value. When the counter exceeds the threshold, the memory controller 200 uses the above sequence steps described earlier in FIG. 2. For example, the memory controller 200 in the node stores a copy of the block corresponding to the address 0x100 in the forwarding buffer 250. The forwarding buffer 250 includes multiple entries. Each entry in the forwarding buffer includes one or more of an indication of an address, a copy of the block corresponding to the address or a pointer identifying a location in another queue which stores data of the block, and status information. The status information includes one or more of an indication of a valid entry, a priority level for the data, and so forth. If a copy of the block corresponding to the address is stored in an entry of the forwarding buffer 250, the data within the block also includes an indication of the lock. The indication is shown as "L" in the entries.

The memory controller 200 uses the directory to determine whether the copy of the given block is in the home node or in another node. Based on this determination, the memory controller 200 allocates an entry in the forwarding buffer from the system memory connected to the memory controller 200 or from the other node. If another node is used to fill the forwarding buffer, in some embodiments, the other node is directed to change the coherency state of its cached copy of the given block to an owned (O) coherency state. When read requests and lock read requests are received and stored in the request queue 220, these requests is serviced directly from the forwarding buffer 250. The requesting nodes is directed to install the copy of the given block from the forwarding buffer 250 with a shared (S) coherency state in its respective cache memory sub system.

Figure 4:
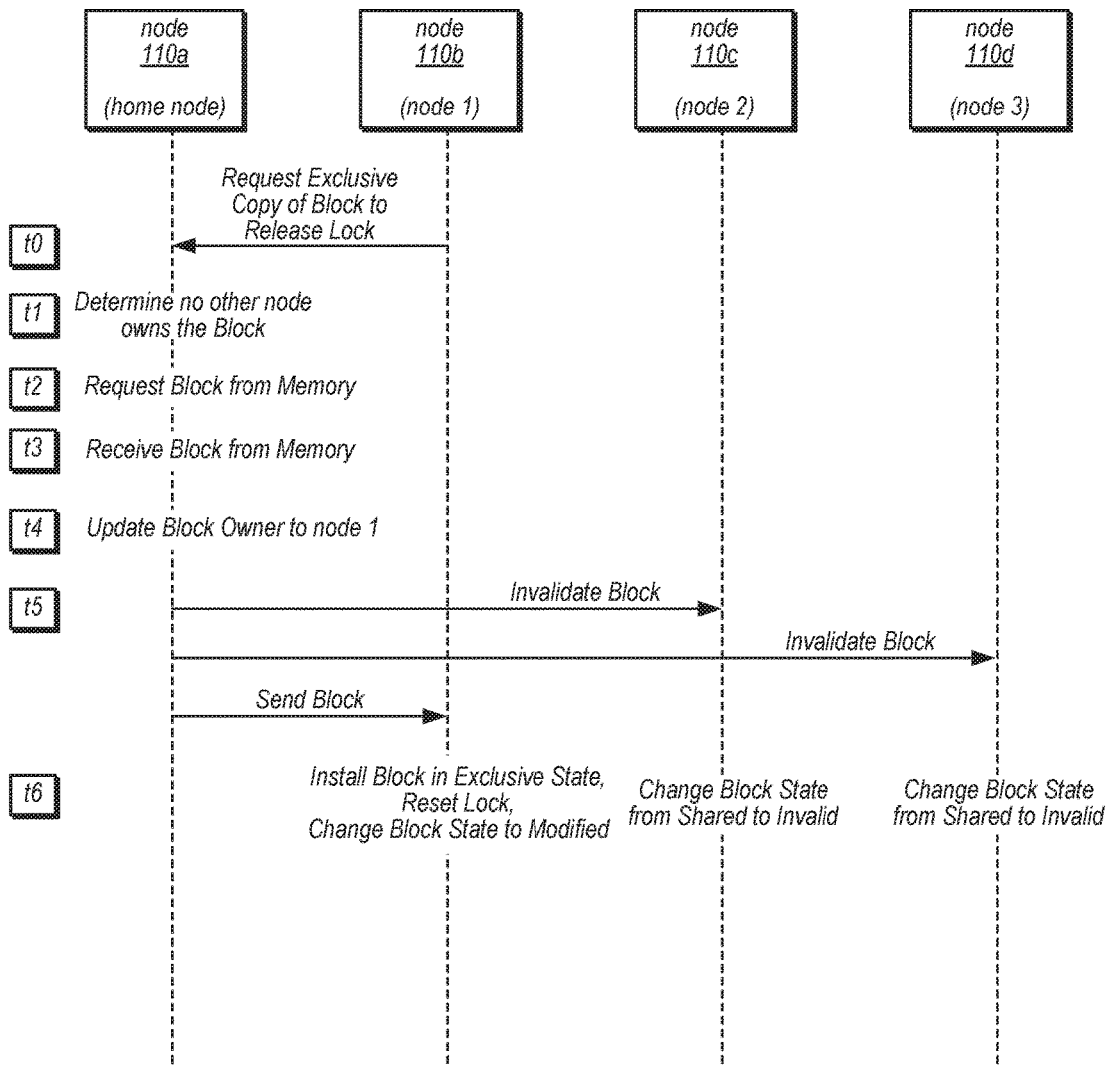
FIG. 4 is a generalized diagram of another embodiment of a sequence diagram used for handling read and write requests in a multi-node computing system.

Referring now to FIG. 4, a generalized block diagram illustrating another embodiment of a sequence diagram used for handling multiple read requests to a home node is shown. Circuitry and logic previously described is numbered identically. As shown, a sequence of steps are used when node 1 previously owned a given block and locked the given block, but node 1 is now finished with its operations that use the given block in a locked state and is ready to release the lock on the given block. At time t0, node 1 sends a request to the home node. The request is a read request for exclusive access to the given block. The exclusive access would allow node 1 to modify the data within the given block and reset the lock.

At time t1, the home node determines there is no separate owner for the given block. For example, the home node has searched a directory and found no allocated entry for the address of the given block, which indicates the given block is not stored in a local cache or in a remote cache with an owned state. Alternatively, the home node may find an allocated entry in the directory which indicates one or more copies of the given block are stored in caches in other nodes with a shared (S) coherency state. As a result, at times t2-t3, the home node accesses its memory, such as DRAM or otherwise, to obtain a copy of the given block.

It is noted that in other examples, if the home node determines a copy of the given block is in another node with an owned (O) or exclusive (E) coherency state and the home node determines a count of read requests for the given data block does not yet exceed a threshold, then the home node directs the other node to send the copy to the home node and invalidate the local copy at the other node.

At time t4, the home node stores an indication that node 1 is the owner node for the given block. The indication is stored in an allocated entry of the directory. At time t5, the home node sends a copy of the given block to the requesting node 1. In addition, the home node sends command packets to other nodes, such as nodes 2-3 with a copy of the block in a shared (S) state, to direct the nodes to invalidate any copy of the given block.

At time t6, node 1 installs the copy of the given block in a local cache with an exclusive (E) coherency state and modifies the data to reset the lock. For example, node 1 may de-assert a lock indication within the data of the given block. node 1 also modifies the coherency state from exclusive (E) to modified (M). nodes 2 and 3 also change a state of the block from Shared to Invalid.

Figure 5:
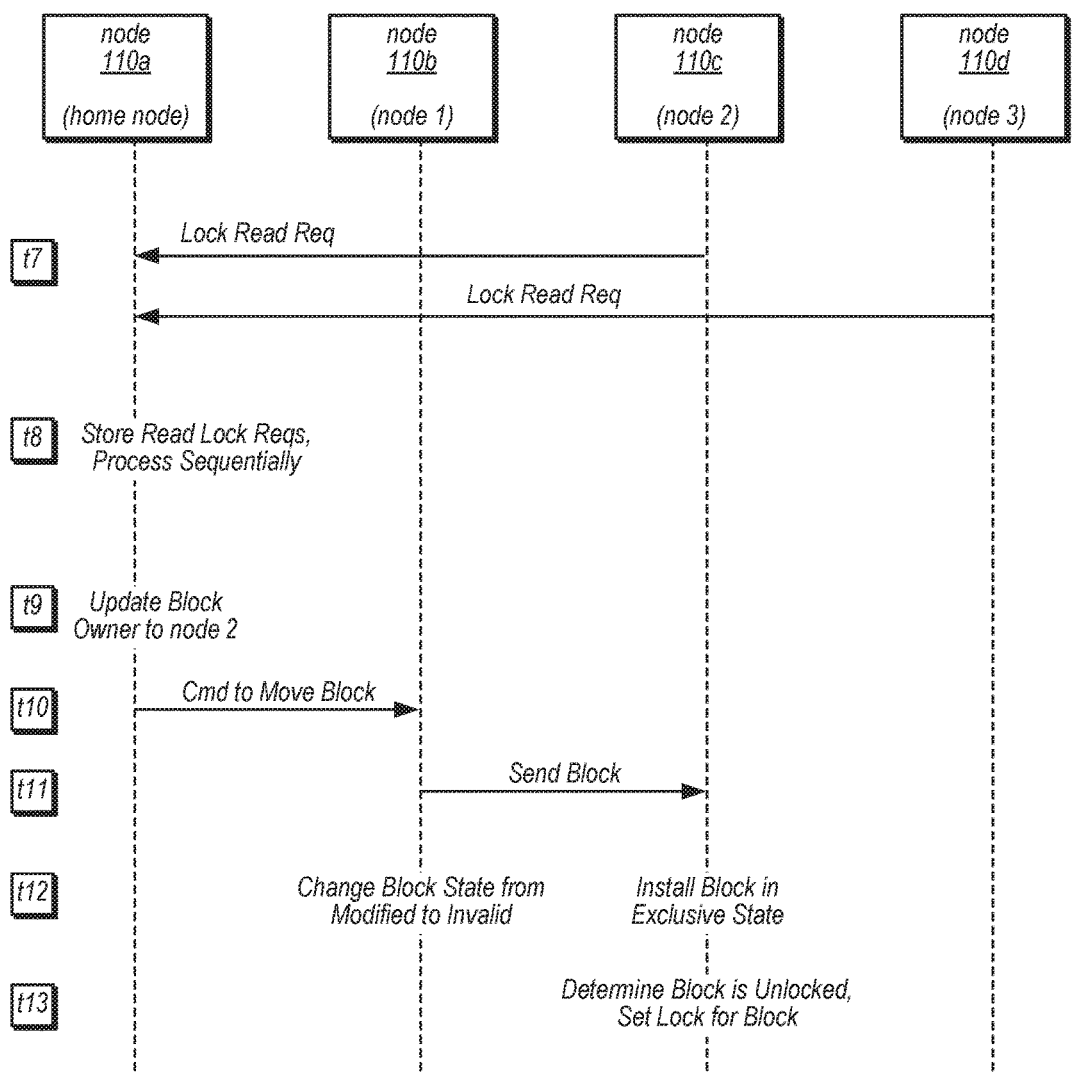
FIG. 5 is a generalized diagram of another embodiment of a sequence diagram used for handling read and write requests in a multi-node computing system.

FIG. 5 depicts a sequence diagram used for handling multiple read requests to a home node is shown. As shown, a sequence of steps at times t7-t13 are used after the sequence of steps at times t0-t6 described above in FIG. 4. Circuitry and logic previously described is numbered identically.

At time t7, a series of lock read requests are sent to the home node. As shown, nodes 2 and 3 send lock read requests to the home node to gain access to the block that was invalidated in the earlier step at time t6 in FIG. 4. Although only 2 nodes are shown sending lock read requests, in other embodiments, other numbers of nodes are used in the computing system which also send lock read requests to the home node.

At time t8, the home node 110a stores the received lock read requests. For example, a request queue is used to store the requests as described earlier. Although lock read requests are shown, any combination of lock read requests and standard read requests are received. A previously discussed, a counter is assigned to track a number of requests corresponding to the block. In the example shown, the lock read request from node 2 is received ahead of other requests for the given block. At time t9, the home node updates ownership of the given block from node 1 to node 2. Additionally, in some embodiments the assigned counter is incremented.

At time t10, the home node sends a command packet to node 1, which directs node 1 to send a copy of the given block to node 2. At time t11, node 1 processes the received command packet and sends a copy of the given block to node 2. At time t12, node 1 invalidates its copy of the given block. node 2 receives the copy of the given block and installs it in a local cache with an exclusive (E) coherency state. At time t13, node 2 reads the data of the given block and finds the given block is unlocked, or available.

Figure 6:
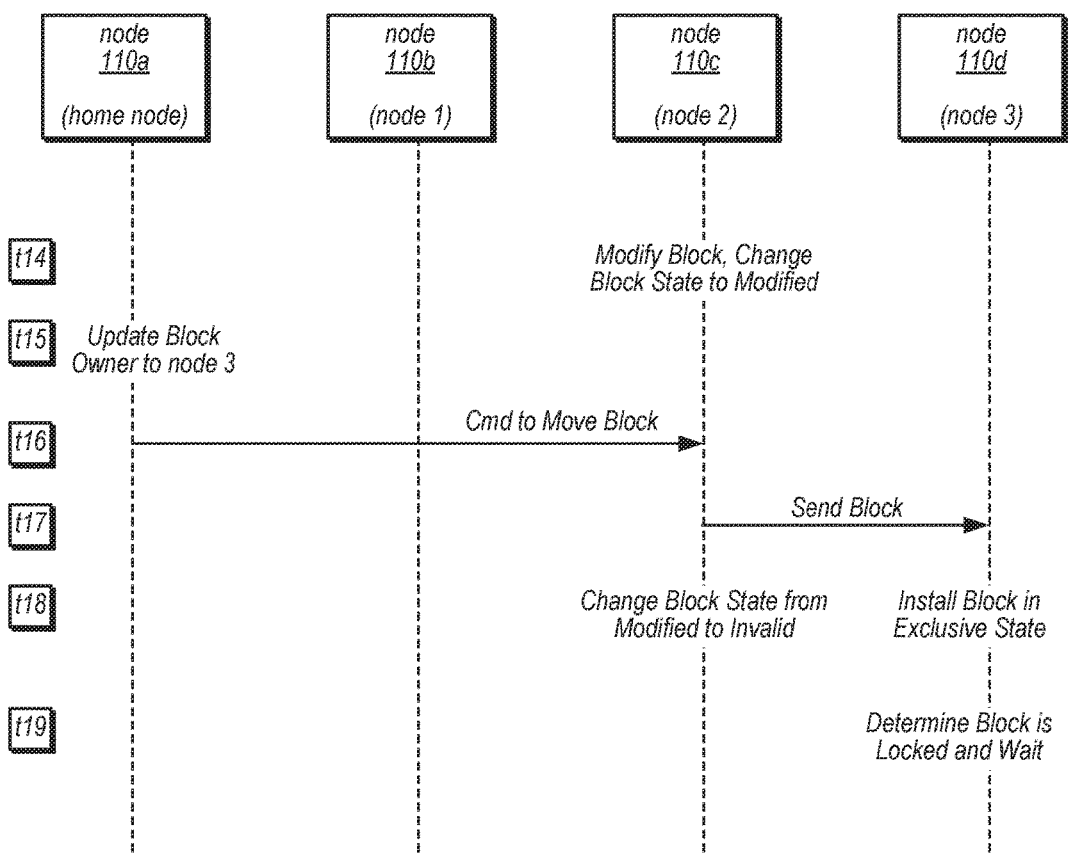
FIG. 6 is a generalized diagram of another embodiment of a sequence diagram used for handling read and write requests in a multi-node computing system.

Turning now to FIG. 6, a sequence diagram used for handling read and write requests in a multi-node computing system is shown. Circuitry and logic previously described is numbered identically. As shown, a sequence of steps at times t14-t19 are presented after the sequence of steps at times t8-t13 described earlier in FIG. 5.

The sequence of steps at times t14-t19 is used after determining conditions are satisfied to change the processing of lock requests and lock release requests in order to reduce a number of hops used to service a series of lock read requests. One or more standard read requests may also be intermingled with the lock read requests.

In response to determining the received block is not locked (at time t13 of FIG. 5), node 2 sets the lock by modifying the lock indication within the given block. At time t13, node 2 also transitions the coherency state for the given block from exclusive (E) to modified (M) as the block's data (though it may only be the lock indication) has been modified. The next lock read request in the request queue in the home node is then be processed. The next lock read request is from node 3. Responsive to processing node 3's Lock Read Request (received at time t7), at time t15 the home node updates ownership of the given block from node 2 to node 3. In some embodiments, the assigned counter for the corresponding address is also incremented. Additionally, the home node determines the assigned counter has not yet exceeded a programmable threshold. In response, at time t16, the home node sends a command packet to node 2, which directs node 2 to send a copy of the given block to node 3.

At time t17, node 2 processes the received command packet and sends a copy of the given block to node 3. At time t18, node 2 invalidates its copy of the given block. node 3 receives the copy of the given block and installs it in a local cache with an exclusive (E) coherency state. At time t19, node 3 reads the data of the given block and finds the given block is locked, or unavailable. In response, node 3 waits as it can't yet use the data of the given block.

For the lock read request from node 3, a minimum of 3 hops is used to process the request. A first hop is used to send the lock read request from node 3 to the home node. This first hop corresponds to the earlier time t7 in FIG. 5. A second hop is used to send the command packet from the home node to node 2. This second hop corresponds to the earlier time t16. A third hop is used to send the copy of the given block from node 2 to node 3. This third hop corresponds to the earlier time t17. This protocol corresponds to a scenario in which the assigned counter has not yet exceeded a configurable threshold. However, when the assigned counter at the home node exceeds the threshold, the minimum number of hops used for processing the lock read requests is reduced from 3 hops to 2 hops.

In various embodiments, when the assigned counter exceeds the threshold, the home node stores a copy of the given block in a forwarding buffer as described earlier. When processing a lock read request stored in the request queue, the home node directly forwards a copy of the given block to the requesting node. No probe or command packet is sent to another node directing the other node to send a copy of the given block to the requesting node. For example, if the lock read request for node 3 caused the assigned counter to exceed the configurable threshold, then the home node may have directly forwarded a copy of the given block to node 3 without including node 2 in any steps. As such, a first hop is still used to send the lock read request from node 3 to the home node. This first hop still corresponds to the earlier step 8 in FIG. 4. However, now a second hop is used to forward the given block from the forwarding buffer of the home node to node 3. A minimum of 2 hops is used rather than 3 hops.

Figure 7:
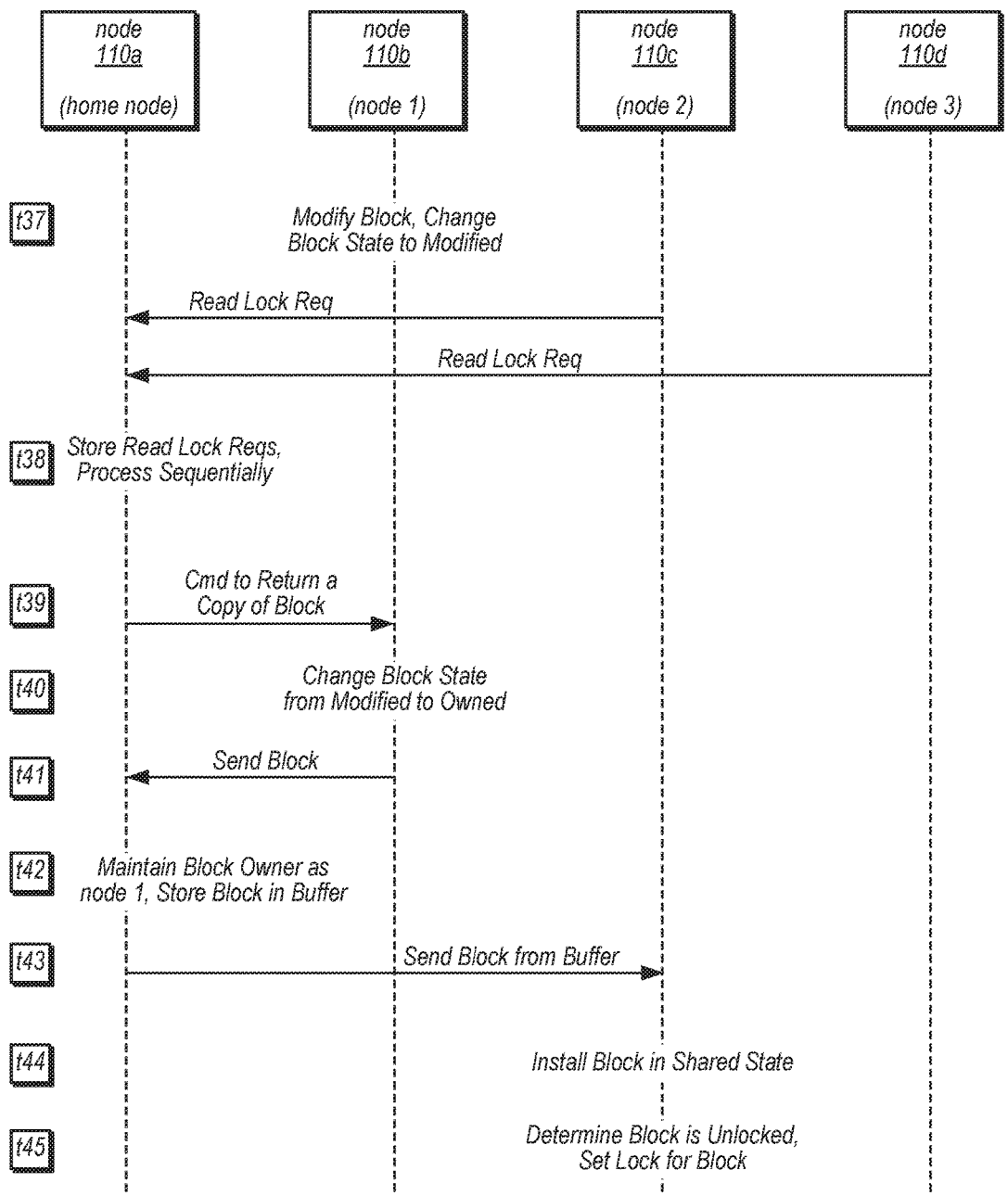
FIG. 7 is a generalized diagram of another embodiment of a sequence diagram used for handling read and write requests in a multi-node computing system.

FIG. 7 illustrates an embodiment for handling read and write requests in a multi-node computing system when the number of requests has met or otherwise exceeded the programmable threshold. Circuitry and logic previously described is numbered identically. As shown, a sequence of steps numbered t37-t45 are used after the sequence of steps at times t0-t6 described earlier in FIG. 4. The steps at times t37-t45 occur after shared copies of the given block are invalidated at other nodes.

At time t37, the home node receives a series of lock read requests from other nodes, such as nodes 2-3. As shown, nodes 2-3 send lock read requests to the home node to gain access to a copy of the given block that was invalidated in the earlier step at time t6 in FIG. 4. In addition, the owner node (110b in this example) resets the lock by modifying the data within the given block and sets the coherency state to modified (M).

Subsequently, at time t38, the home node stores the received lock read requests. In a given scenario, the previous read request for the address corresponding to the given block may have been the exclusive read request to reset the lock within the data of the given block. This read request was processed during the sequence of steps at times t0-t6 described earlier. A second read request corresponding to the same address is the lock read request from node 2 at time t37 as shown in FIG. 7. In some embodiments, this lock read request causes the assigned counter to exceed the threshold. Now, in various embodiments, rather than send a command packet to node 1 that directs node 1 to invalidate its local copy of the given block after sending it to node 2, the home node sends a different type of command packet.

At time t39, the home node sends a command to node 1 which directs node 1 to send a copy of the given block to the home node, rather than to node 2. At time t40, node 1 processes the received command and transitions the coherency state of the given block from modified (M) to owned (O). At time t41, node 1 sends a copy of the given block to the home node. At time t42, the home node stores the received copy of the given block in a forwarding buffer.

The home node further updates a directory entry for the given block to indicate node 1 is the owner node. In some embodiments, the home node also writes a copy of the received given block to its system memory, such as memory 130a described earlier. In various embodiments, if node 1 is finished with the given block after resetting the lock, node 1 also sends an indication to the home node that the local copy at node 1 is being (or has been) invalidated. In such a case the home node would not store an indication in the directory that node 1 owns the block. If node 1 is not yet finished with its copy of the given block, it maintains its copy with the owned (O) coherency state.

At time t43, the home node directly forwards a copy of the given block from its forwarding buffer to node 2. node 2 receives the copy of the given block. As directed by the packet from the home node, node 2 installs the given block in a local cache with a shared (S) coherency state. At time t44, node 2 reads the data of the given block and finds the given block is unlocked, or available. In response, node 2 modifies the data to set the lock within the data of the given block at time t45. node 2 then transitions the coherency state for the given block from exclusive (E) to modified (M) in view of this modification.

Figure 8:
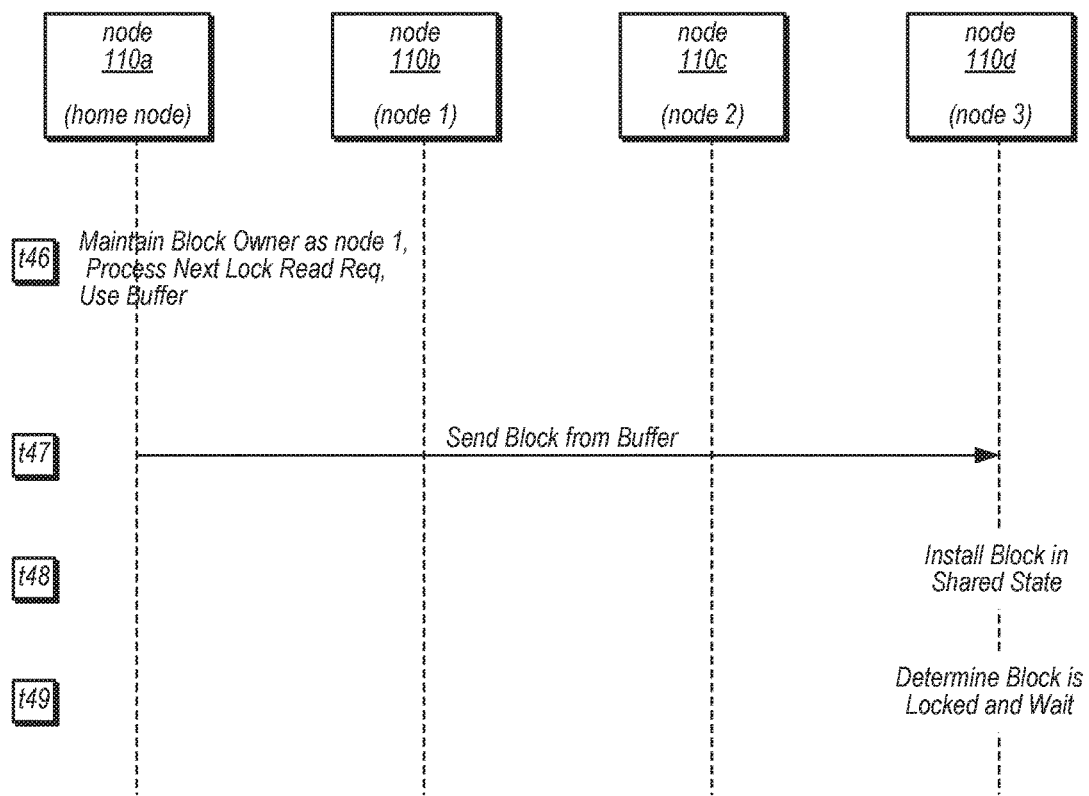
FIG. 8 is a generalized diagram of another embodiment of a sequence diagram used for handling read and write requests in a multi-node computing system.

FIG. 8 illustrates the processing of lock read requests at a point in time after the steps of FIG. 7. As shown, a sequence of steps at times t46-t49 are used after the sequence of steps at times t37-t45 described earlier in FIG. 7. At time t46, the next lock read request in the request queue in the home node is processed. The next lock read request is from node 3 as the earlier read requests from nodes 1-2 have already been processed. If node 1 did not invalidate its copy of the given block, then the home node maintains an indication that node 1 is the owner node for the given block. In this example, the assigned counter has exceeded the threshold.

At time t46, the home node accesses its forwarding buffer. At time t47, the home node directly forwards a copy of the given block from its forwarding buffer to node 3. node 3 receives the copy of the given block and as directed by the packet from the home node, at time t48, node 3 installs the given block in a local cache with a shared (S) coherency state. At time t49, node 3 reads the data of the given block and finds the given block is locked, or unavailable. In response, node 3 waits as it can't yet use the data of the given block.

Figure 9:
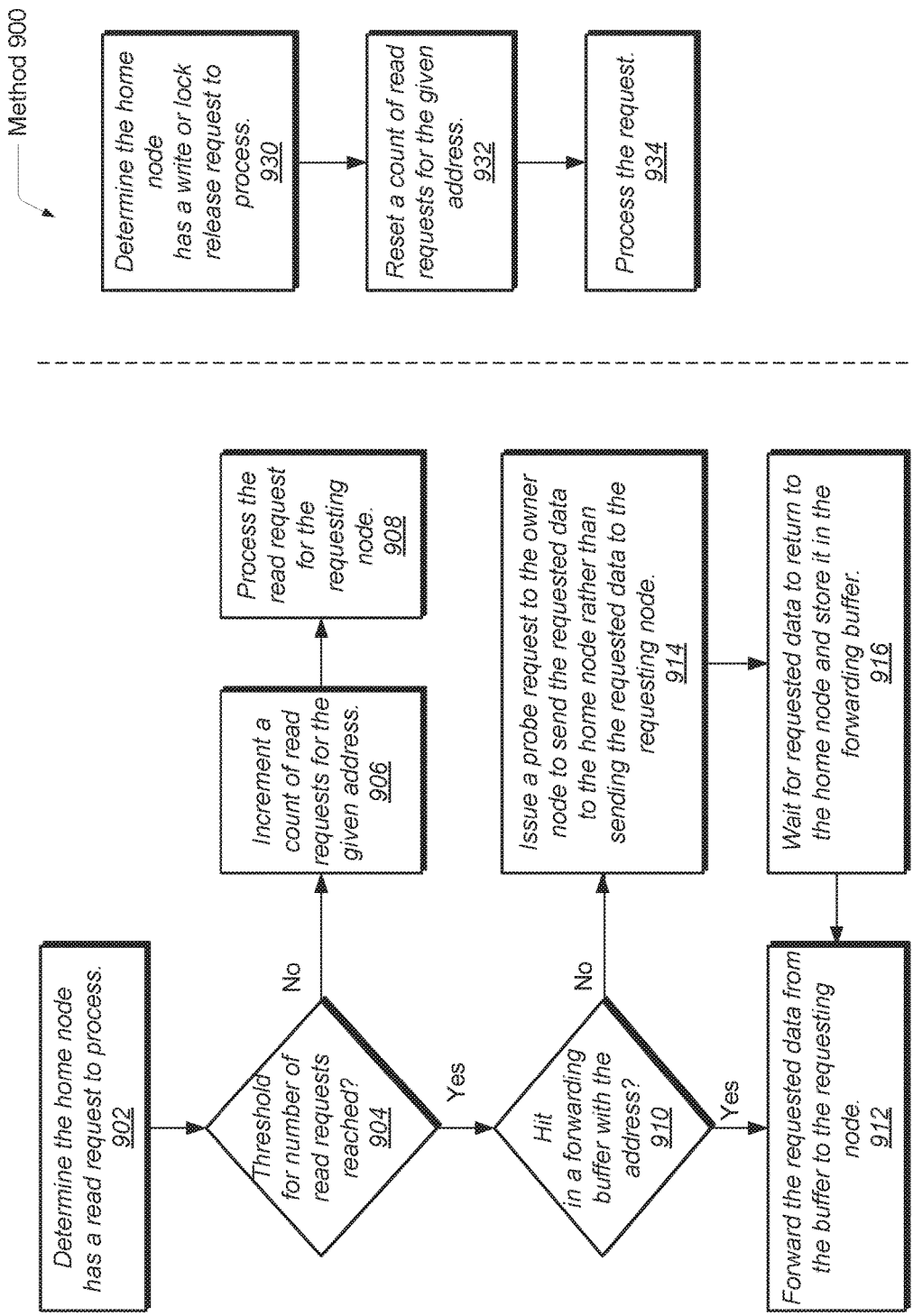
FIG. 9 is a generalized flow diagram of one embodiment of a method for processing a series of read requests in a multi-node computing system.

Turning now to FIG. 9, one embodiment of a method 900 for processing a series of read requests in a multi-node computing system is shown. For purposes of discussion, the steps in this embodiment are shown in sequential order. However, in other embodiments some steps occur in a different order than shown, some steps are performed concurrently, some steps are combined with other steps, and some steps are absent.

In block 902, a home node in a multi-node computing system determines it has a read request to process. In various embodiments, the home node includes a request queue to store received requests. Additionally, the home node is configured to keep a count of read requests for a given block. For example, in some embodiments, a count is associated with the target address of the block and incremented when a request for the block is received. In various embodiments, the count is reset when a write request or a lock release request for a block corresponding to the address is detected.

In the example shown, if a threshold number of read requests for the address has not been exceeded (conditional block 904), then in block 906 the count of read requests for the address is incremented. In block 908, the read request (or the oldest pending read request) is processed for the requesting nodes. In some embodiments, the requested data is sent to the requesting node. The requested data has been retrieved from a local cache of the home node, from a system memory of the home node, or from the cache of another node that is currently storing a copy of the requested data. In the latter case, a command (e.g., a probe request or other message) is sent from the home node to the other node to direct the other node to forward the data to the requesting node.

If the threshold number of read requests for the address has been met (e.g., equaled or exceeded depending on the embodiment) (conditional block 904), and there is a hit in a forwarding buffer of the home node (conditional block 910), then in block 912 the requested data is forwarded from the buffer to the requesting node. If there is a miss in the buffer of the home node (conditional block 910), then in block 914 the home node issues a request to the owner node to send the requested data to the home node rather than sending it to the requesting node. In block 916, the home node waits for the requested data to return and, when it does return, stores it in a forwarding buffer of the home node. Afterward, control flow of method 900 moves to block 912 where the home node forwards a copy of the data to the requesting node.

In block 930, the home node determines it has a write request or a lock release request to process. In block 932, the home node determines the address corresponding to the request and resets the count of read requests for the data, if any. Previously, the home node may have been forwarding data from the forwarding buffer to requesting nodes for read requests corresponding to the address due to the count exceeding a threshold. However, upon a reset of the count, the home node ceased using the forwarding buffer for read requests corresponding to the address. In block 934, the home node processes the write request or the lock release request.

Figure 10:
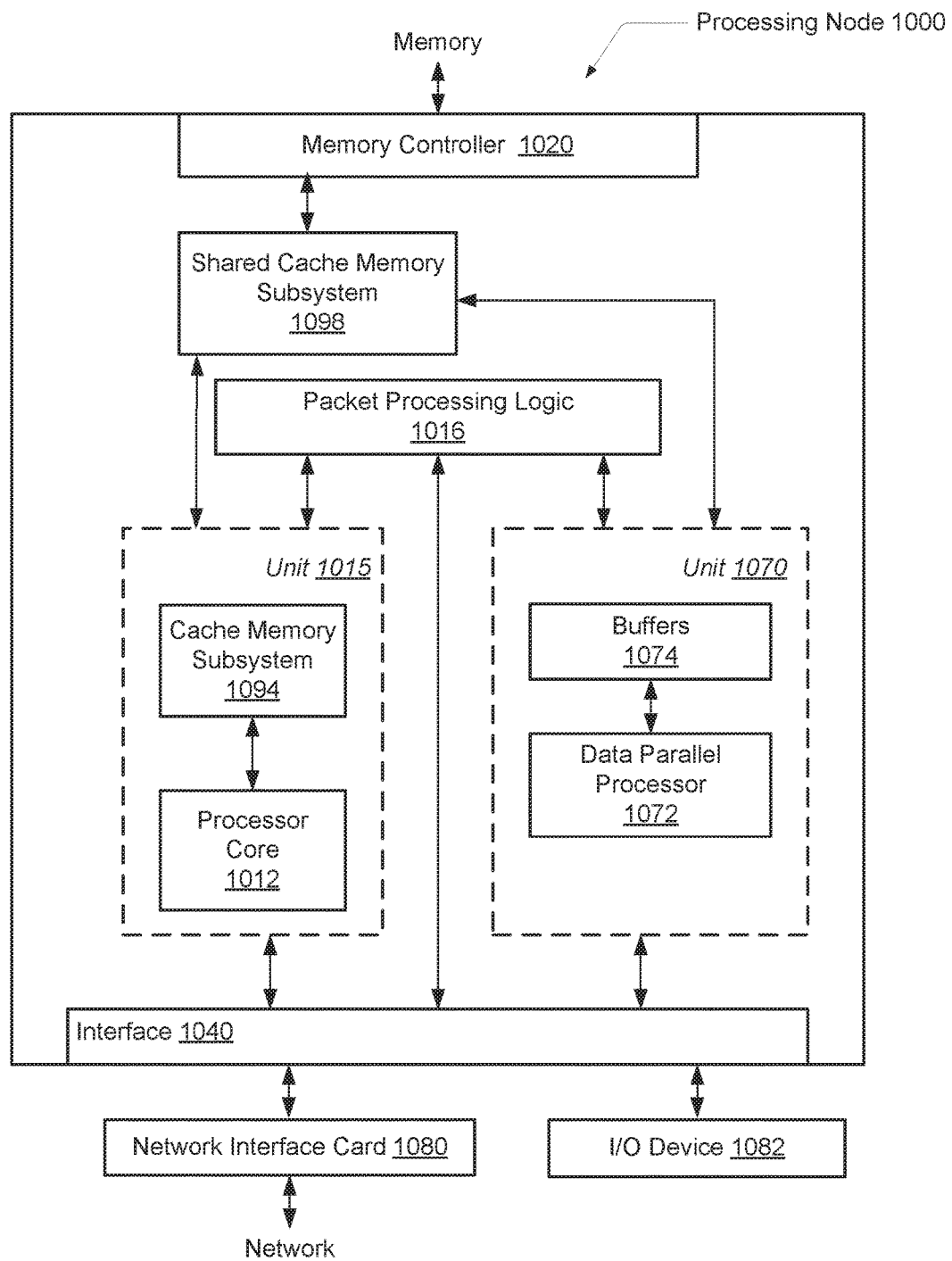
FIG. 10 is a generalized diagram of one embodiment of an exemplary processing node.

Referring to FIG. 10, one embodiment of an exemplary processing node 1000 is shown. In some embodiments, the illustrated functionality of processing node 1000 is incorporated upon a single integrated circuit. The processing node 1000 is used as one or more nodes in the multi-node computing systems described earlier. Processing node 1000 includes one or more processing units 1015, each of which includes one or more processor cores 1012 and an associated cache memory subsystem 1094. In various embodiments, processor core 1012 utilizes a general-purpose micro-architecture.

In one embodiment, processor cores 1012 include circuitry for executing instructions according to a predefined general-purpose instruction set. For example, the SPARC® instruction set architecture (ISA) is selected. Alternatively, the x86, x86-64®, Alpha®, PowerPC®, MIPS®, PA-RISC®, or any other instruction set architecture is selected. Generally, processor core 1012 accesses the cache memory subsystems 1094, respectively, for data and instructions. If the requested block is not found in cache memory subsystem 1094 or in shared cache memory subsystem 1098, then a read request is generated and transmitted to the memory controller 1020 within the node to which the missing block is mapped. Cache memory subsystems 1094 is integrated within respective processor cores 1012. Both the cache memory subsystem 1094 and the shared cache memory subsystem 1098 includes a cache memory coupled to a corresponding cache controller.

Processing node 1000 also includes one or more processing units 1070, which includes one or more processor cores 1072 and data storage buffers 1074. In various embodiments, processor core 1072 is not a mirrored silicon image of processor core 1012. Rather, processor core 1072 may has a micro-architecture different from the micro-architecture used by processor core 1012. In some embodiments, the processor core 1072 includes a micro-architecture that provides high instruction throughput for computationally intensive tasks. In some embodiments, processor core 1072 has a parallel architecture. For example, in some embodiment the processor core 1072 is a single instruction multiple data (SIMD) based core. Examples of SIMD cores include graphics processing units (GPUs), digital signal processing (DSP) cores, or otherwise. In one embodiment, the processing node 1000 includes a single instruction set architecture (ISA).

The threads of software applications are scheduled on one of processor cores 1012 and 1072 in a manner that each thread has the highest instruction throughput based at least in part on the runtime hardware resources of the processor cores 1012 and 1072. In some embodiments, processing unit 1070 is a graphics processing unit (GPU). Conventional GPUs utilize very wide single instruction multiple data (SIMD) architectures to achieve high throughput in highly data parallel applications. Each object is processed independently of other objects, but the same sequence of operations is used.

In one embodiment, the unit 1070 is integrated on the motherboard. In another embodiment, the illustrated functionality of processing node 1000 is incorporated upon a single integrated circuit. In such an embodiment, each of unit 1015, which is a CPU, and unit 1070, which is a GPU, is a proprietary core from different design centers. Also, the GPU 1070 is able to directly access both local memories 1094 and 1098 and main memory via memory controller 120 from the processing node 1000, rather than performing memory accesses off-chip via interface 1040. This embodiment may lower latency for memory accesses for the GPU 1070, which may translate into higher performance.

Generally, packet processing logic 1016 is configured to respond to control packets received on the links to which processing node 1000 is connected, to generate control packets in response to processor cores 1012 and 1072 and/or cache memory subsystems 1094, and to generate probe commands and response packets in response to transactions selected by memory controller 1020 for service, and to route packets for which node 1000 is an intermediate node to other nodes through interface logic 1040. In some embodiments, the packet processing logic 1016 may be referred to as a crossbar switch.

Interface logic 1040 includes logic to receive packets and synchronize packets to an internal clock used by packet processing logic 1016. Interface logic 1040 also includes logic to communicate with one or more input/output (I/O) devices (1082). In some embodiments, the interface logic 1040 directly communicates with external devices without utilizing the packet processing logic 1016, a crossbar switch or another component. For example, network messages is conveyed directly between each of the unit 1015 and the network interface card 1080 and similarly between each of the unit 1070 and the network interface card 1080.

In the embodiment shown, the interface logic 1040 includes at least a Universal Serial Bus (USB) interface, a Serial ATA bus interface to storage devices, a PCI Express Peripheral Component Interconnect Express (PCIe) serial expansion bus interface, a low pin count (LPC) bus, a peer-to-peer (P2P) direct memory access (DMA) controller, and so forth. Other embodiments hay exclude one or more of the foregoing and/or may include other devices or technologies.

The processing node 1000 is connected to a network interface card (NIC) 1080. The NIC 1080 includes circuitry and logic for communicating with other processing nodes across a network. For example, the NIC 1080 utilizes logic to communicate with a physical layer and a data link layer standard such as Ethernet, Fibre Channel, Wi-Fi or Token Ring. The NIC 1080 allows for communication with a group of close by computers on a same local area network (LAN). Additionally, the NIC 1080 allows for communication with other nodes across a network. The NIC 1080 includes a network protocol stack such as a HTTP protocol for an application layer, a TCP protocol for a transport layer, an IP protocol for an internet layer, an Ethernet protocol for a data link layer, and an IEEE 802.3u protocol for a physical layer.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   storing a plurality of data blocks at a home node of a plurality of nodes;
   receiving a request at the home node from a first node, the request being a request for access to a given data block of the plurality of data blocks;
   maintaining a count of a number of read requests at the home node for the given data block;
   in response to determining both the given data block is currently stored at a second node and the count has exceeded a threshold, the home node:
   requesting a copy of the given data block from the second node;
   storing the copy of the given data block at the home node responsive to receiving the given data block from the second node; and
   forwarding the copy of the given data block from the home node to the first node.

2. The method as recited in claim 1, wherein one or more of the read requests is a lock read request used for synchronizing access to the given data block by allowing read access to the given data block by a requesting node in a locked state until the requesting node is ready to release the lock on the given data block.

3. The method as recited in claim 2, wherein the method further comprises refraining the home node from communicating with the second node regarding requests for access to the given data block received after receiving said request from the first node.

4. The method as recited in claim 1, wherein in response to said requesting, the method further comprises changing a cache coherency state of the given data block stored at the second node to an owned cache coherency state.

5. The method as recited in claim 1, wherein in response to said forwarding, the method further comprises storing the given data block with an indication of a shared cache coherency state in each of the first node and any node of the plurality of nodes receiving a forwarded copy of the given data block from the home node.

6. The method as recited in claim 5, wherein the method further comprises:
setting a lock for the forwarded copy of the given data block at the first node, in response to determining the given data block is available for being locked; and
waiting to use the forwarded copy of the given data block at the first node, in response to determining the given data block is locked.

7. The method as recited in claim 1, wherein the method further comprises resetting the count responsive to receiving either a write request or a lock release request for the given data block.

8. The method as recited in claim 1, wherein the method further comprises storing the given data block in a buffer in the home node that is used for forwarding copies of the given data block to nodes of the plurality of nodes requesting the given data block, wherein the buffer is separate from a system memory of the home node.

9. A computing system comprising:
a home node configured to store a plurality of data blocks;
a first node configured to generate access requests for data blocks stored at the home node;
a second node configured to generate access requests for data blocks stored at the home node;
wherein the home node is configured to maintain a count of a number of read requests at the home node for the given data block; and
wherein in response to receiving a request at the home node from the second node for access to the given data block and determining both the given data block is currently stored at the first node and the count has exceeded a threshold, the home node is configured to:
request a copy of the given data block from the first node;
store the copy of the given data block at the home node responsive to receiving the given data block from the first node; and
forward the copy of the given data block from the home node to the second node.

10. The computing system as recited in claim 9, wherein one or more of the read requests is a lock read request used for synchronizing access to the given data block by allowing read access to the given data block by a requesting node in a locked state until the requesting node is ready to release the lock on the given data block.

11. The computing system as recited in claim 10, wherein the second node is further configured to:
setting a lock for the forwarded copy of the given data block at the second node, in response to determining the given data block is available for being locked; and
waiting to use the forwarded copy of the given data block at the second node, in response to determining the given data block is locked.

12. The computing system as recited in claim 10, wherein the home node is configured to refrain from communicating with the first node regarding requests for access to the given data block received after receiving said request from the first node.

13. The computing system as recited in claim 12, wherein the home node is further configured to reset the count responsive to receiving either a write request or a lock release request for the given address corresponding to the given data block.

14. The computing system as recited in claim 10, wherein:
the computing system further comprises a plurality of nodes including the first node and the second node;
the home node is further configured to store the given data block in a buffer that is used for forwarding copies of the given data block to nodes of the plurality of nodes requesting the given data block; and
the buffer is separate from a system memory of the home node.

15. The computing system as recited in claim 9, wherein in response to said requesting, the home node is further configured to change a cache coherency state of the given data stored at the first node to an owned cache coherency state.

16. The computing system as recited in claim 9, wherein in response to said forwarding, the home node is further configured to store the given data block with an indication of a shared cache coherency state in each of the second node and any node of the plurality of nodes receiving a forwarded copy of the given data block from the home node.

17. A non-transitory computer readable storage medium storing program instructions, wherein the program instructions are executable by a processor to:
store a plurality of data blocks at a home node of a plurality of nodes;
maintain a count of a number of read requests at the home node for the given data block;
in response receiving a request at the home node from a first node, the request being a request for access to a given data block of the plurality of data blocks, and determining both the given data block is currently stored at a second node and the count has exceeded a threshold, cause the home node to:
request a copy of the given data block from the second node;
store the copy of the given data block at the home node responsive to receiving the given data block from the second node; and
forward the copy of the given data block from the home node to the first node.

18. The non-transitory computer readable storage medium as recited in claim 17, wherein one or more of the read requests is a lock read request used for synchronizing access to the given data block by allowing read access to the given data block by a requesting node in a locked state until the requesting node is ready to release the lock on the given data block.

19. The non-transitory computer readable storage medium as recited in claim 18, wherein the program instructions are further executable to:
set a lock for the forwarded copy of the given data block at the first node, in response to determining the given data block is available for being locked; and
wait to use the forwarded copy of the given data block at the first node, in response to determining the given data block is locked.

20. The non-transitory computer readable storage medium as recited in claim 18, wherein the program instructions are further executable to refrain the home node from communicating with the second node regarding requests for access to the given data block received after receiving said request from the first node.

\* \* \* \* \*